(12) United States Patent
Fredlund et al.

(10) Patent No.: US 6,628,895 B2
(45) Date of Patent: Sep. 30, 2003

(54) APPARATUS AND METHOD FOR OBTAINING SPECIAL IMAGES FROM A ONE TIME USE CAMERA

(75) Inventors: John R. Fredlund, Rochester, NY (US); Carl A. Testa, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/785,616

(22) Filed: Feb. 16, 2001

(65) Prior Publication Data

US 2002/0164160 A1 Nov. 7, 2002

(51) Int. Cl.[7] .................. G03B 15/00; G03B 17/24; G03B 17/00; G03B 27/52
(52) U.S. Cl. .................. 396/5; 396/311; 396/419; 355/21; 355/40
(58) Field of Search .................. 396/5, 311, 419, 396/429, 317, 315, 310; 355/21, 40

(56) References Cited

U.S. PATENT DOCUMENTS

| 4,427,279 | A | | 1/1984 | Edelstein et al. | ........... 396/317 |
|---|---|---|---|---|---|
| 5,189,453 | A | | 2/1993 | Boyd | ........... 396/317 |
| 5,285,226 | A | * | 2/1994 | Frosig et al. | ........... 396/419 |
| 5,525,459 | A | | 6/1996 | Peterson | ........... 235/462.05 |
| 5,530,517 | A | | 6/1996 | Patton et al. | ........... 235/462.05 |
| 5,587,752 | A | | 12/1996 | Petruchik | ........... 396/315 |
| 5,761,558 | A | | 6/1998 | Patton et al. | ........... 396/429 |
| 5,885,759 | A | | 3/1999 | Nakamura | ........... 430/496 |
| 6,272,287 | B1 | * | 8/2001 | Cipolla et al. | ........... 396/6 |

* cited by examiner

Primary Examiner—Russell Adams
Assistant Examiner—Rochelle Blackman
(74) Attorney, Agent, or Firm—Frank Pincelli

(57) ABSTRACT

A system for capturing an image of an instruction provided on a card by a camera. The fixture includes support surface having a cradle for receiving a camera. A support member extending from the support surface for supporting the support surface a fixed distance from a surface on which the fixture is placed. The instruction card is placed in the fixtures. The photofinisher during scanning of the developed film automatically reads a coded instruction and fulfills the order in accordance with the instruction.

8 Claims, 5 Drawing Sheets

APPARATUS AND METHOD FOR OBTAINING SPECIAL IMAGES FROM A ONE TIME USE CAMERA

FIELD OF THE INVENTION

The present invention relates to a fixture and system for automatically providing goods and/or services based on scanning processed film.

BACKGROUND OF THE INVENTION

It is known to "pre-burn" images on photographic film. A frame or frames have been exposed during manufacture of a One Time Use Camera (OTUC) so that an image which is not captured by the user of the camera is available for printing. A method for creating a latent image on the film in a camera is described in U.S. Pat. No. 5,189,453 issued to Boyd. This method provides the user of the camera with latent imagery that is not captured by that user, but the exposure must be made at the time of manufacture, and the quality of the image is limited to that which the OTUC is capable of obtaining. Since this image is captured at the time of manufacture, the capture of the special image precedes the use of the camera, often by a period of months. Also, due to the economics of the manufacturing and distribution systems, the use of special exposures is limited to large lot sizes. A small number of special image exposures corresponding to an event is not economically feasible. Additionally, the stocking of OTUCs specific to particular special images poses a problem. If the popularity of the particular type of special image wanes, the retailer is left with undesirable OTUCs.

Another approach is to use a fixture to capture special images at the point of sale. The OTUC is placed in a fixture to capture an "image of an image." This method suffers from poor quality due to the capture and illumination system of the OTUC, or if well illuminated, from the expense of that illumination. This capture must be of a special image captured prior to purchase of the OTUC. Additionally, this method is capable of economically capturing only a special image of another image. The logistics of capturing a "real" scene by the retailer are prohibitive.

Another method of indicating a desire for special photofinishing or images is that of U.S. Pat. No. 5,587,752 issued to Petruchik. This method uses a special camera to place marks on the film. These marks may make selections from an image set specified by a code placed on the film at the time of film manufacture. This method utilizes a specialized camera and an image set code encoded at the time of manufacture.

One of the purposes of the present invention is to overcome these limitations.

SUMMARY OF THE INVENTION

In accordance with one aspect of the present invention there is provided a fixture for capturing an image of an instruction card by a camera, the fixture comprising, a support member extending from the support surface for supporting the support surface a fixed distance from a surface on which the fixture is placed, said support member defining a retaining area for receiving an instruction card so that said camera placed on said cradle can capture an image of an image of an instruction placed on said instruction card.

In accordance with another aspect of the present invention there is provided a system for capturing an image of an instruction card by a camera, the system comprising, a fixture having a support surface having a cradle for receiving a camera and a support member extending from the support surface for supporting the support surface at a fixed distance from a surface on which the fixture is placed; and an instruction card having an instruction thereon for placement in the fixture so that the camera placed on the cradle can capture an image of the instruction card.

In accordance with yet another aspect of the present invention there is provided a method for obtaining goods and/or services by using a camera and a fixture, said fixture having a support surface having a cradle for receiving the camera fixed distance from a surface on which the fixture is placed, the support member defining a retaining area for receiving an instruction placed on the instruction card comprising the steps of:

a. capturing an image of an instruction card placed in the fixture on film in a camera that is positioned on the cradle, the instruction card having at least one machine readable code thereon;

b. developing the film;

c. scanning the developed film so as read the machine readable code; and d. providing at least one goods and/or services with respect to the machine readable code.

In still anther aspect of the present invention there is provided a method for obtaining goods and/or services by using a camera and a fixture, the fixture having a support surface having a cradle for receiving the camera and a support member extending from the support surface for supporting the camera fixed distance from a surface on which the fixture is placed, the support member defining a retaining area for receiving an instruction card so that the camera placed on the cradle can capture an image of an instruction card, comprising the steps of;

a. capturing an image of an instruction card placed in the fixture on film in a camera that is positioned on the cradle, the instruction card having at least one machine readable code thereon;

b. forwarding the captured image of the instruction card to a photofinisher; and c. providing at least one goods and/or services with respect to the machine readable code.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
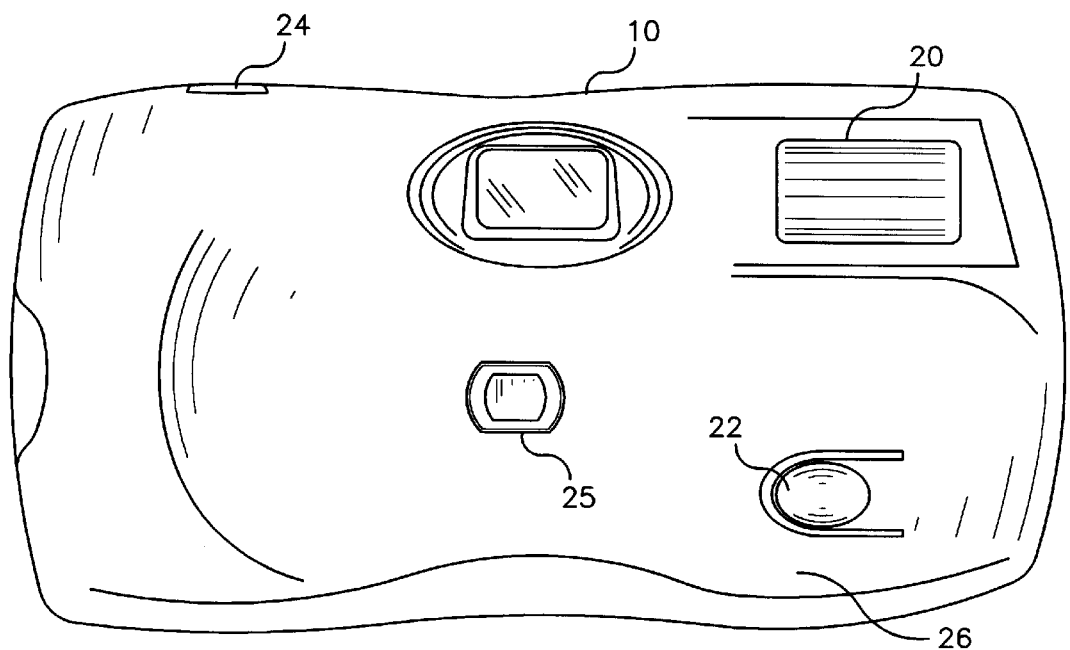
FIG. 1 is front elevation view of a typical prior art one time use camera.

Referring to FIG. 1 there is illustrated typical prior art one time use camera 10. The camera 10 includes flash 20, a flash charging button 22 for activating charging of the flash 20 and shutter switch 24 for causing the camera to take a picture and discharge the flash 20 as appropriate. The flash 20 and charging button 22 are provided on the front surface 26 of the camera 10. The camera 10 also includes a lens 25 for capturing of an image which is also provided on the front surface 26.

Figure 2:
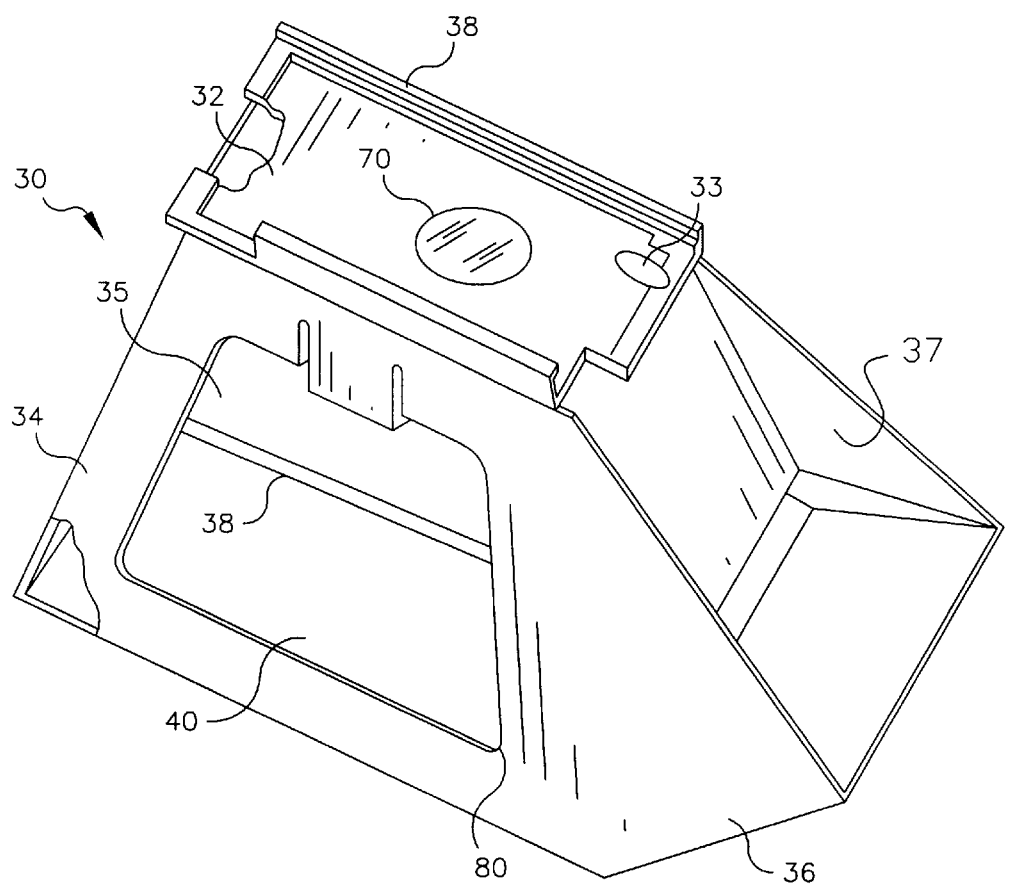
FIG. 2 is a perspective view of a fixture made in accordance with the present invention designed for use with the camera of FIG. 1.

The camera 10 of FIG. 1 is designed for placement in a fixture 30 as shown in FIG. 2. In particular the fixture 30 includes a support surface 32 for engaging the front surface 26 of camera. The fixture 30 also includes support members 34, 35, 36 and 37 for supporting fixture 30 on a surface, preferably a flat surface such as table. The support members 34, 35, 36, and 37 form an inner periphery 39 which defines a retaining area 40 for receiving a instruction card 100. Preferably the outer perimeter of instruction card 100 is such that it mates with the inner periphery 39 so that the image on the instruction card 100 will be properly aligned with respect to the lens of camera 10. Fixture 30 is preferably made of an inexpensive material such as cardboard. The support surface 32 is configured so as to provide a cradle 38 for receiving the camera 10 and is configured such that the flash charging switch 24 is actuated by projection 33 provided in fixture 30 upon placement of camera 10 in cradle 38. The cradle 38 also maintains the camera 10 in a fixed position with respect to a instruction card 100 to be place beneath support surface 32. By this arrangement, the flash 20 in camera 10 is ready to illuminate the subject when shutter switch 24 is pressed. In certain cameras a flash 20 may not be provided. In such situations a light (not shown) of an appropriate intensity may be provided for properly illuminating the instruction card 100. The light may be provided with the fixture 30 or placed outside and positioned to illuminate the instruction card 100 through an opening 80 provided in one of support members 34, 35, 36 and 37. Fixture 30 also includes a diopter lens 70 which is positioned to be adjacent the lens of camera 10. The diopter lens 70 designed such that the focus of camera 10 is modified to match the distance from the One Time Use Camera (OTUC) to the retaining area 40 of fixture 30. A fixture of this type is described in U.S. Pat. No. 5,285,226 issued to Frosig.

Figure 3:
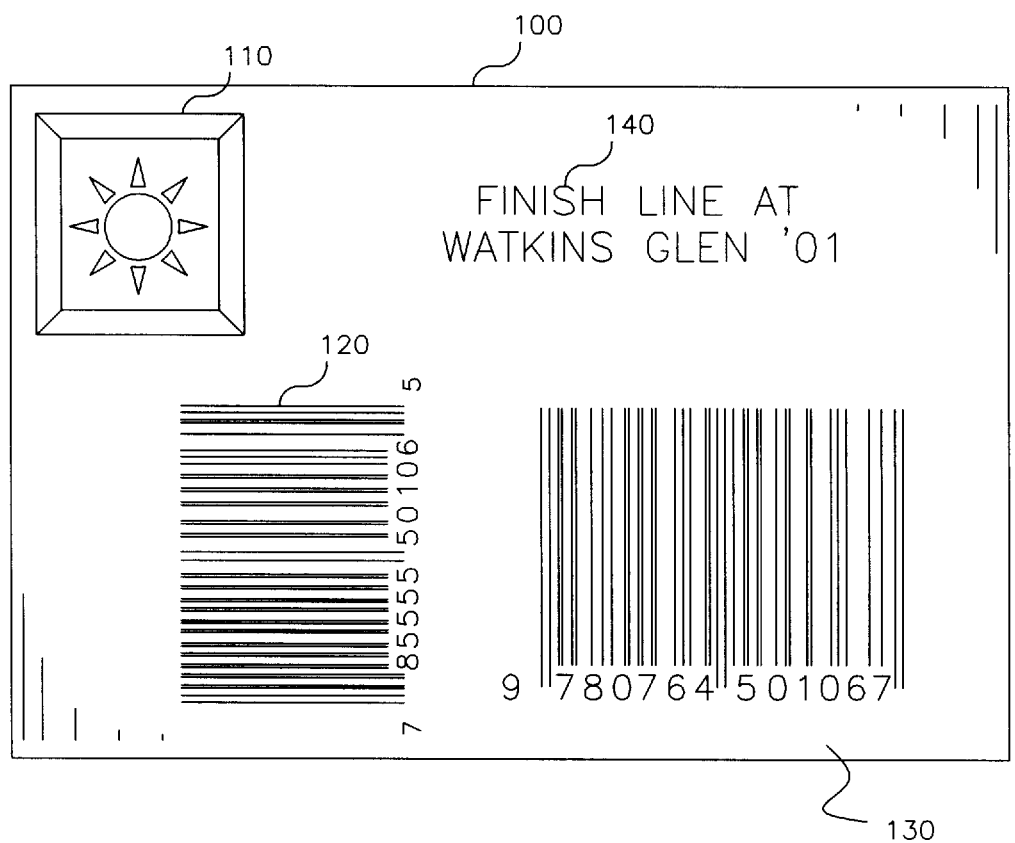
FIG. 3 is plan view of code card made in accordance with the present invention for use with the fixture of FIG. 2.

FIG. 3 shows image instruction card 100 having an identifier indicia 110 thereon. The identifier indicia alerts the photofinisher that this is a special instruction with regard to the providing of goods and/or services. In the embodiment illustrated machine readable codes 120 and 130 are also provided on instruction card 100. Code 120 is associated with identifying a particular retailer, store, individual, etc., and a code 130 is associated with providing a particular instruction. In the embodiment illustrated code 130 is an event instruction. In particular code 130 represents the providing of a stock image of the Finish Line at Watkins Glen Raceway for the year 2001. Text 140 is provided on instruction card 100 so that the retailer/user will select the appropriate card for the desired goods and/or services. Instruction card 100 is inserted into fixture 30 at retaining area 40. In the embodiment illustrated, two codes are provided. However, one or any number of codes may be provided.

Figure 4:
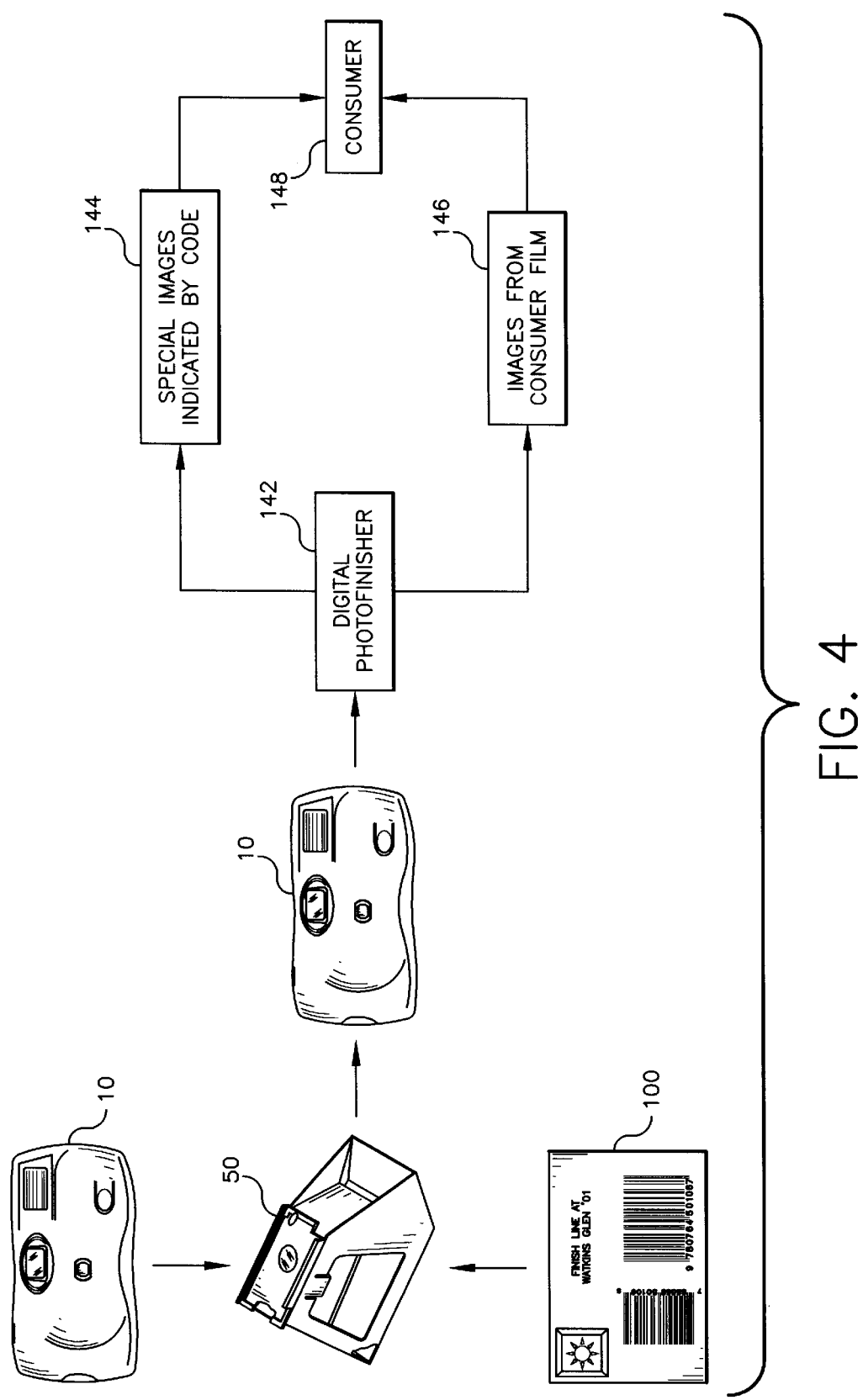
FIG. 4 is system diagram of the components of FIGS. 1–3 made in accordance with the present invention.

FIG. 4 shows camera 10 and special instruction card 100 that is to be inserted into fixture 30. When the shutter switch 24 on camera 10 is pressed, flash unit 20 fires, (assuming the camera 10 has a flash) and an image of the special instruction card 100 is captured. camera 10 is delivered to the consumer, who uses the camera in the usual fashion. Upon finishing with the camera 10, the user has the film processed.

The camera 10 may be delivered to a photofinisher 142 of the consumer's choice or the camera 10 may be sent via mailer to a photofinisher 142. The photofinisher 142 provides special images and/or products and/or services 144 as indicated by the image code, for example by code 120 or 130. The photofinisher also creates prints of the images captured by the consumer in step 146. In step 148, the special images (good and/or services associated with the codes) and consumer captured prints of the images on the film are returned to the consumer.

Figure 5:
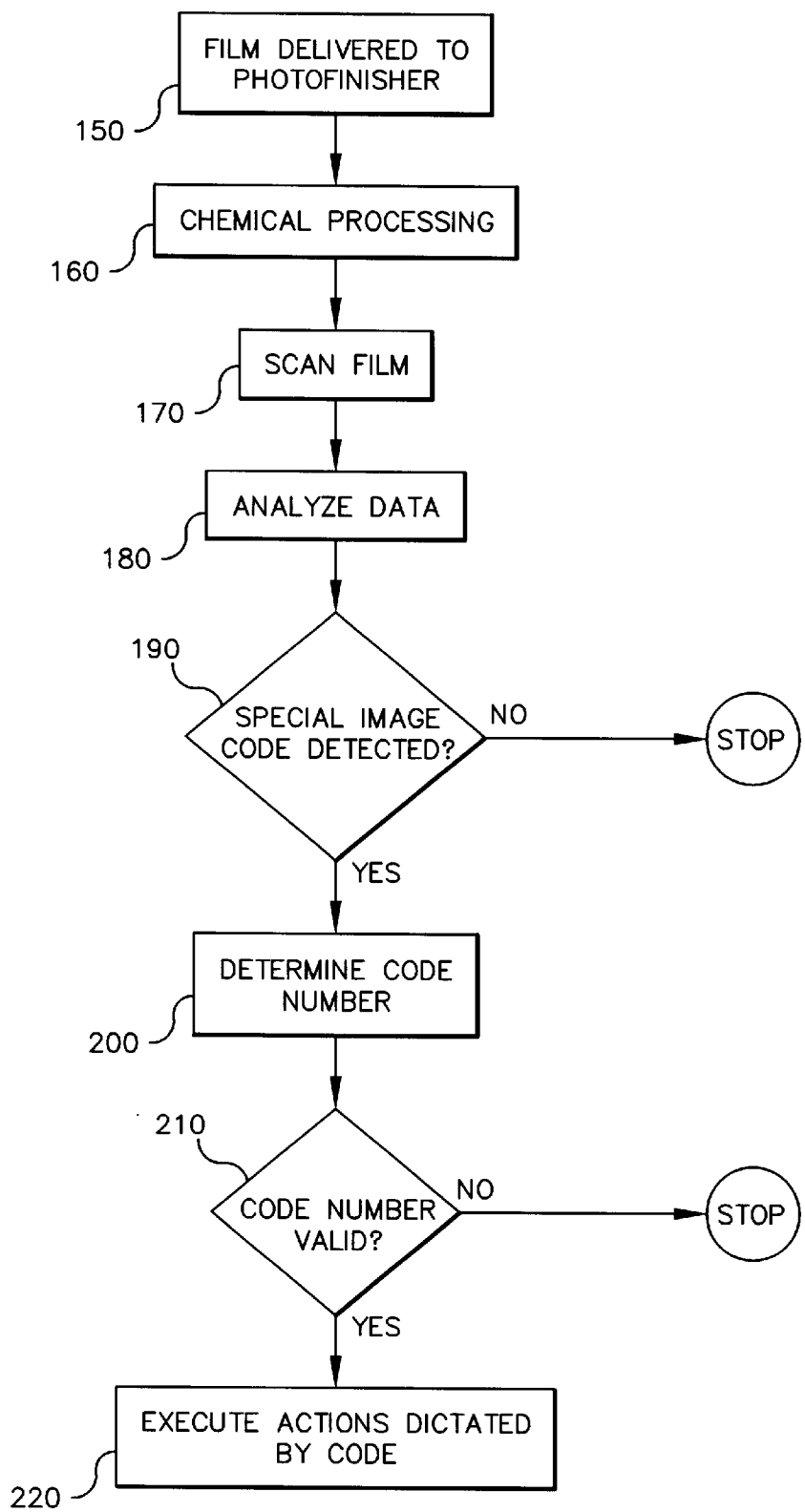
FIG. 5 is a flow chart of the operation of the system of FIG. 4.

The steps followed by the digital photofinisher will follow the steps shown in more detail in FIG. 5. Film in the OTUC is delivered to the photofinisher in step 150 and is processed in step 160 as is common in the art. Thus the image of the instruction card 100 is developed on the film. Then the film is scanned by a film scanner in step 170. The film scanner is provided with appropriate software for automatically analyzing the images scanned on the film. In particular the scanner is capable of recognizing if a special instruction card 100 has been captured. Thus, in step 180 data obtained from scanning of the film is analyzed to determine if a special instruction card 100 is present. At step 190 if a image code card image is detected, any code number present is determined at step 200. The code number or number may be checked against a database for validity in step 210. Provided the code number is valid, the photofinisher will automatically execute the actions dictated by the code in step 220. These actions may include the inclusion of a special image or images, or processing the images from film in a specific manner, such as cartooning, adding of text, ordering of multiple prints and/or desired size prints. It is of course understood that any desired feature, product and/or service that may be ordered is identified by the code or codes provided on the instruction card 100.

The codes 120 and/or 130 on instruction card 100 may also be incorporated into other useful objects. For example, the codes may be incorporated into the fixture 30, or into a prepaid mailer bag (envelope) which is well known in the photofinishing industry. In the latter case, the bag is inserted into the fixture in place of instruction card 100. Using the prepaid bag with codes in place of the instruction card 100 allows a correspondence between the goods or service to be provided and the film carrying the latent image of the codes. The prepaid mailer also ensures that the film is delivered to a photofinisher enabled to read the codes and provide the corresponding goods or services.

Another use for the code is to provide payment information. The appropriate codes may be provided to indicate that payment has been made or needs to be made when images are picked up.

While the present invention is particular useful with One Time Use camera, which typically have a single fixed focal length, the present invention is not so limited. It may be used with any type film camera. In addition, if so desired, the present invention may be used with electronic cameras where the digital image files are sent on to a photofinisher over a communication network, such as the internet, for providing of goods and/or services. At least one of the digital image files contains an image of a special code as captured by an electronic camera. The associated digital image may also be sent to the photofinisher over the communication network. Alternatively the digital images may be forwarded using a digital storage device, such as a flash card or memory card.

The invention has been described in detail with particular reference to certain preferred embodiments thereof, but it will be understood that variations and modifications can be effected within the scope of the invention.

PARTS LIST

| | |
|---|---|
| 10 | camera |
| 20 | flash |
| 22 | charging button |
| 24 | shutter switch |
| 25 | lens |
| 26 | front surface |
| 30 | fixture |
| 32 | support surface |
| 33 | projection |
| 34 | support member |
| 35 | support member |
| 36 | support member |
| 37 | support member |
| 38 | cradle |
| 39 | inner periphery |
| 40 | area |
| 70 | diopter lens |
| 100 | instruction card |
| 110 | indicia |
| 120 | machine readable codes |
| 130 | machine readable codes |
| 140 | text |
| 142 | photofinisher |
| 144 | special images/products/services |
| 146 | step |
| 148 | step |
| 150 | step |
| 160 | step |
| 170 | step |
| 180 | step |
| 190 | step |
| 200 | step |
| 210 | step |
| 220 | step |

What is claimed is:

1. A method for obtaining goods and/or services by using a camera and a fixture, said fixture having a support surface having a cradle for receiving said camera and a support member extending from said support surface for supporting said camera fixed distance from a surface on which the fixture is placed, said support member defining a retaining area for receiving an instruction card so that said camera placed on said cradle can capture an image of an instruction placed on said instruction card comprising the steps of;

a. capturing an image of an instruction card placed in said fixture on film in a camera that is positioned on said cradle, said instruction card having at least one machine readable code thereon;
   b. developing said film;
   c. scanning said developed film so as automatically read said machine readable code; and
   d. providing at least one of the goods and/or services with respect to said machine readable code.

2. A method according to claim 1 wherein said camera includes a flash.

3. A method for obtaining goods and/or services by using a camera and a fixture, said fixture having a support surface having a cradle for receiving said camera and a support member extending from said support surface for supporting said camera a fixed distance from a surface on which the fixture is placed, said support member defining a retaining area for receiving an instruction card so that said camera placed on said cradle can capture an image of an instruction placed on said instruction card, comprising the steps of;

a. capturing an image of an instruction card placed in said fixture on film in a camera that is positioned on said cradle, said instruction card having at least one machine readable code thereon;
   b. forwarding the captured image of said instruction card to a photofinisher; and
   c. providing at least one of the goods and/or services with respect to said machine readable code.

4. A method according to claim 3 wherein said forwarding of said captured image is accomplished over a communication network.

5. A method according to claim 4 wherein said communication network is the internet.

6. A method according to claim 3 wherein an associated digital image is also forwarded to the photofinisher.

7. A method according to claim 3 wherein said camera further includes a charging button for activating charging of said flash.

8. A method according to claim 7 wherein said support surface is provided with a projection for activating of said charging button.

* * * * *